W. H. COOK.
LOCK FOR CROSS CHAINS.
APPLICATION FILED AUG. 31, 1920.
1,379,968.
Patented May 31, 1921.
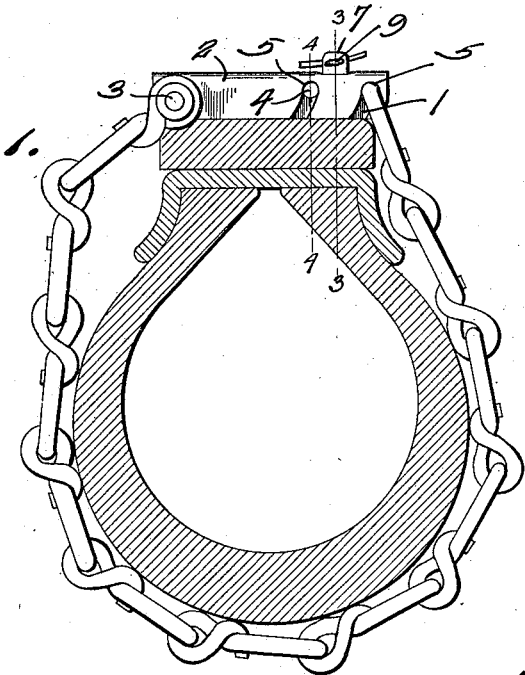
Fig. 1.
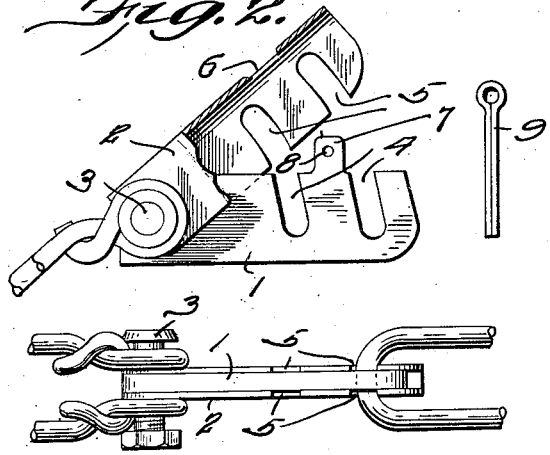
Fig. 2.
Fig. 5.
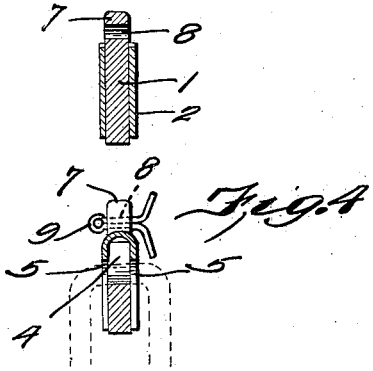
Fig. 3.
Fig. 4.
Witness
Inventor
W. H. Cook,
By Lester T. Sargent
Attorney

UNITED STATES PATENT OFFICE.

WILLIAM HENRY COOK, OF LEE, MASSACHUSETTS.

LOCK FOR CROSS-CHAINS.

1,379,968. Specification of Letters Patent. Patented May 31, 1921.

Application filed August 31, 1920. Serial No. 407,115.

*To all whom it may concern:*

Be it known that I, WILLIAM H. COOK, a citizen of the United States, residing at Lee, in the county of Berkshire and the State of Massachusetts, have invented a new and useful Lock for Cross-Chains, of which the following is a specification.

The object of my invention is to provide a very simple but efficient lock for cross chains for automobile tires which may be locked by means of a cotter pin, and to provide means for adjustment in such a device. I attain the objects of my invention by the illustration in the accompanying drawings, in which:

Figure 1 is a side elevation of the invention applied to an automobile tire and cross chain;

Fig. 2 is a detailed view, partly in elevation and partly in section, of the device in unlocked position;

Fig. 3 is a section on line 3—3 of Fig. 1;

Fig. 4 is a section on line 4—4 of Fig. 1: and

Fig. 5 is a bottom plan view of the device.

Like numerals designate like parts in each of the several views.

Referring to the accompanying drawings I provide a lock plate 1, having spaced slots 4 either of which is adapted to receive the end link of a cross chain, and having an upper extension 7, provided with an aperture 8. I further provide a lock plate cover 2, of U-shape in crosss section and pivoted to plate 1 by pivot 3. This plate is provided with a slot 6 positioned to receive the extension 7. When the outer plate 2 is closed over the inner plate 1, and when slots 5 corresponding in position to slots 4 of plate 1, the respective slots being of such size as to leave an approximately round opening through both plates when they are in closed or overlapping position. In Fig. 4 the cotter pin 9 may be inserted through the aperture 8 of lock 7 and thus securely fasten the plate 2 in place, thus holding the end link of the cross chain engaged in one of the openings left by slots 4 and 5 of the respective plates, as shown in Fig. 1.

The operation of the device will be apparent from the accompanying drawings in connection with the foregoing description of its construction. Slots 4 are provided to give a means of adjustment to suit tires of different sizes to which the cross chain may be applied.

What I claim is:

1. In a lock for cross chains, the combination of interengaging pivoted plates, the outer plate being U-shaped in cross section, each of the plates having overlapping transverse slots, the outer plate having a central slot, the inner plate having a perforated projection shaped to pass through said central slot, and fastening means for said plates, said means comprising a cotter pin insertible through the perforated projection named, substantially as and for the purposes described.

2. In a lock for cross chains, the combination of interlocking connecting plates, each of the plates having corresponding transversely disposed slanting slots, the outer plate having a central slot and the inner plate having a projection of suitable shape and size to project through said central slot, said projection being perforated, and means insertible through said projection securing the plates in interlocked relation, in which relation the transverse slots provide an opening to receive the end link of a tire chain, as shown.

WILLIAM HENRY COOK.